July 2, 1946.  F. E. SCOTT  2,403,404
VACUUM SIPHON PERCOLATOR
Filed Aug. 10, 1943  4 Sheets-Sheet 1

INVENTOR
FRANK EARL SCOTT
BY O. W. Lee
ATTORNEY

July 2, 1946.   F. E. SCOTT   2,403,404
VACUUM SIPHON PERCOLATOR
Filed Aug. 10, 1943   4 Sheets-Sheet 2

INVENTOR
FRANK EARL SCOTT
BY O. W. Lee
ATTORNEY

July 2, 1946.  F. E. SCOTT  2,403,404
VACUUM SIPHON PERCOLATOR
Filed Aug. 10, 1943  4 Sheets-Sheet 3

INVENTOR
FRANK EARL SCOTT
BY O. W. Lee
ATTORNEY

July 2, 1946. F. E. SCOTT 2,403,404
VACUUM SIPHON PERCOLATOR
Filed Aug. 10, 1943 4 Sheets-Sheet 4

FIG. 12

INVENTOR
FRANK EARL SCOTT
BY O. W. Lee
ATTORNEY

Patented July 2, 1946

2,403,404

UNITED STATES PATENT OFFICE 2,403,404

VACUUM SIPHON PERCOLATOR

Frank Earl Scott, Wallace, Idaho

Application August 10, 1943, Serial No. 498,068

9 Claims. (Cl. 99—302)

The present invention relates to certain new and useful improvements in a percolator for making the widely popular beverage of coffee, and is particularly directed to a vacuum siphon percolator, which utilizes suction instead of internal pressure, to lift the hot water into an upper chamber containing the ground coffee.

The invention provides a main chamber from which the air is exhausted by boiling a small quantity of water therein, while constantly venting the resulting steam, so as to relieve any pressure. A hot water container is connected to this main chamber by a siphon in which there is interposed a ground coffee container, so that when the vent of the main chamber is closed, the condensing of the steam therein will provide a suction to draw the hot water through the siphon and pass it through the ground coffee and into the main chamber ready for dispensing.

This eliminates the need for the ground coffee chamber to have the same capacity as the main chamber, as is necessary in vacuum type percolators of the prior art, which makes these prior art devices top-heavy and easily tipped over when the water is forced into the upper chamber, leaving but little weight in the lower chamber.

Furthermore, the present invention makes it possible for the ground coffee container to be completely sealed from atmosphere while the hot water is passing through the ground coffee, thus providing an improvement of paramount importance, which precludes loss of coffee aroma to the air while the coffee is percolating, which is an unavoidable inaptitude of prior art vacuum percolators, and which is the prime purpose of the present invention to eliminate, so that the completed coffee beverage will contain a far greater percentage of the natural aroma, which would otherwise be lost to the atmosphere, as is glaringly obvious by the fact that when making coffee in any kind of a percolator open to atmosphere, the smell of coffee is readily noticeable about the room. Not that this odor is objectionable, but rather that this aroma would be more desirable to the sense of taste, than to the sense of smell while in the room.

According to the present invention the hot water is passed through the coffee a single time only and in one direction only, which reduces the amount of extraction of fixed oils, bitter principle, and vegetable extractive matter, which are constituents of the ground coffee not desirable in the completed beverage. That is to say, that in the prior art practices wherein the total quantity of water is in contact with the ground coffee for a period of time, there is a greater extraction of these undesirable constituents than would occur if the hot water was gradually passed through the coffee a single time as in the present invention, so as to extract the volatile aroma and leave most of these undesirable constituents in the coffee grounds. This improvement greatly enhances the aroma and taste of the completed coffee beverage; and also of paramount importance, it produces a coffee beverage, that when immediately bottled and sealed, will keep for several days and retain its aroma and taste, without decomposition which would otherwise occur when there was considerable vegetable extractive matter present. This enables the invention to be utilized to distribute individual bottles of coffee in commercial quantities to restaurants, soda fountains, and stores, to be served either hot or cold as desired.

Preferably the hot water container is formed as a water jacket around the main chamber, so as to serve as a control for the condensing of the steam in the main chamber and thus preclude too rapid a flow. Also this enables a small quantity of water to be left in the water jacket so that it can be heated to form steam to keep the completed coffee beverage hot without applying direct heat thereto.

The invention is susceptible of various embodiments, and the accompanying drawings show the best modes that have thus far been devised.

Figure 1:
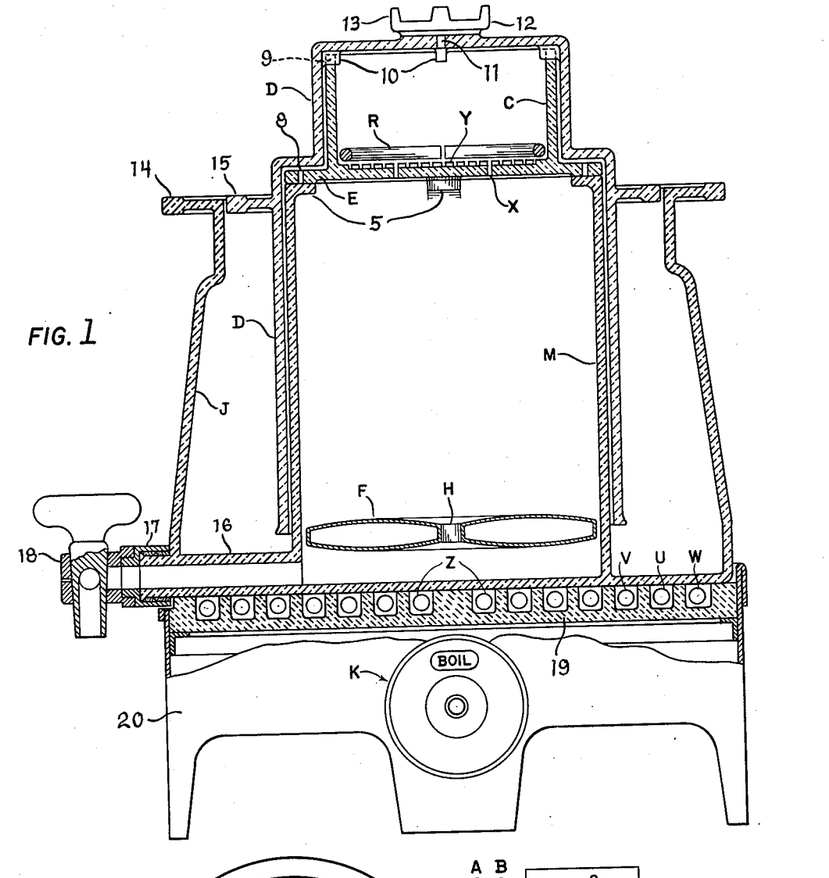
Fig. 1 shows a vertical section of one form of the invention, including a hot plate with a plurality of heating elements.
Figures 4, 5, 6, 7:
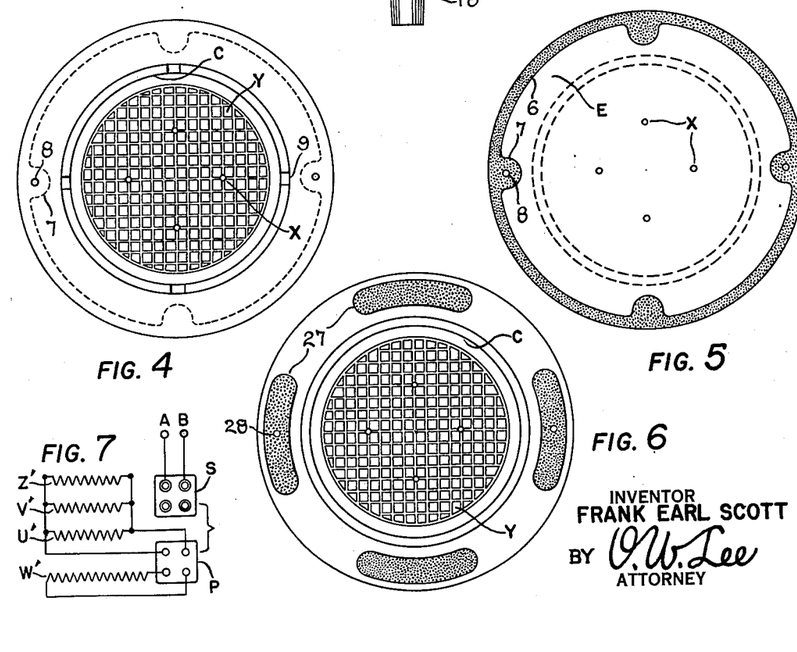
Fig. 4 is a top plan view of the ground coffee container of Fig. 1.
Fig. 5 is a plan view of the underside of the coffee container shown in Fig. 4 and Fig. 1.
Fig. 6 is a top plan view of the ground coffee container of Fig. 3.
Fig. 7 is an electrical diagram of suitable circuit controls for the heating elements of Figs. 9 and 10, and equally applicable to Fig. 1.

As shown in Fig. 1, the main chamber M is formed integral with a water jacket J, and the ground coffee container C is provided with a bottom flange E which seats on the rim of the main chamber M which is provided with internal lips 5. As shown in Fig. 5 the underside of this flange E has a ground annular portion 6 which includes widened areas 7, corresponding to the lips 5 on the main chamber M. The rim and lips 5 are also ground flat, so that all of these contacting areas, seat air tight. One or more of the widened areas 7 is provided with a vent as indicated at 8. It will be seen that this vent 8 is closed when positioned on the described lip 5, and can be opened by merely turning the ground coffee container C so that the vent is clear of the lip 5.

To provide the previously described siphon facilities, a bell jar D telescopically encloses the ground coffee container C and the main chamber M, leaving suitable clearance for the passage of hot water from the water jacket J. The top edge of the ground coffee chamber C is provided with notches 9, and the bell jar D is provided with lugs 10 which engage in these notches so that rotating the bell jar will also rotate the ground coffee container and thereby position the vents 8 either in or out of register with the lips 5, so as to open or close the vents as required. The top of this bell jar is provided with a vent 11 which may be closed in any suitable manner, as for instance there is here shown a plate 12 which will suffice when the contacting surfaces are ground to seat. This plate 12 may be provided with suitable legs 13 for supporting the plate in an inverted position over the vent when open.

The bottom of the bell jar D terminates a short distance above the bottom of the water jacket J so as to terminate the siphon action when the water is reduced to this level, and thus leave a suitable quantity of water in the water jacket for the purpose previously described. This water jacket may be of any suitable shape for esthetic appearance and is of such size that it will have a greater capacity than the main chamber M. An external flange 14 is provided on this water jacket for convenience of lifting, and a similar flange 15 is provided on the bell jar D so as to loosely cover this water jacket.

A drain tube 16 extends from the main chamber M through the outer wall of the water jacket, where it is provided with a threaded ferrule 17 to which the spigot 18 is attached.

To minimize vaporization of volatile aroma from the surface of the completed coffee beverage, the main chamber M is preferably provided with a float F. As here shown, this float is hollow and is provided with a central tube H which serves as a reinforcement to withstand pressure changes caused by temperature differentials. As here shown the walls of the float are externally convex so as to better withstand pressure changes; and also, so that when water vapor is formed under the float, the bubbles will promptly travel both centrally to the tube H and peripherally, so that the water vapor will gradually escape from under the float and thus preclude pounding and bumping during the boiling period.

As shown in Fig. 1 and Fig. 4 the bottom of the ground coffee container C is provided with a number of perforations X through which the percolated coffee passes into the main chamber M. The inside of the bottom of the ground coffee container C is provided with a filter support Y which consists of a multiplicity of elevations formed by a network of intersecting channels as clearly shown in Fig. 4. A loose ring R is provided in the ground coffee container C so as to serve as a weight to preclude floating of whatever kind of filter sheet that may be used upon this support Y. This eliminates the need for any draw string in the filter, and also makes it possible to use filter paper, which is preferable because of its low cost and can be discarded after each instance of use. Any other suitable means of filtering may be employed; as for instance, the well known glass filter of Patent 1,927,287 may be employed with suitable modifications.

In the operation of the device, the main chamber M is primed with a cup of water, and a measured quantity of water is placed in the water jacket J so that the quantity of water above the bottom of the bell jar D will be just sufficient to appropriately fill the main chamber M when subsequently siphoned thereinto. In actual practice this is conveniently accomplished by providing the water jacket J with an index line indicating the level of fill. A filter sheet is placed on the support Y and weighted with the ring R, after which a measured quantity of ground coffee is placed in the ground coffee container C. The float F is then placed in the main chamber M, and the ground coffee container C is then assembled in position with the vent 8 out of register with the lip 5, whereupon the bell jar D is assembled in position with the closure 12 in an inverted position so as to open the vent 11. The device is then in readiness for operation.

Preferably, the water is preheated before being placed in the device, so as to shorten the period of operation. In any event, the water in the water jacket J is brought to a boil, and due to the greater quantity of water therein, the lesser quantity of water in the main chamber M will be more liberally boiled in the same interval and thus produce sufficient steam vapor to effectually dispel the air from the main chamber.

The heating is then discontinued and the bell jar D is rotated so as to turn the ground coffee container C and position the vent 8 in register with the lip 5, and then the plate 12 is used to close the vent 11. The water in the water jacket J completes the hermetic seal for the bell jar and the parts enclosed thereby. As the temperature gradually drops, the steam in the main chamber M will condense and thereby produce a partial vacuum, so that the water will be siphoned from the water jacket J up into the ground coffee container C and through the ground coffee and thence into the main chamber M; the lift of the water being accomplished by external atmospheric pressure, instead of by resorting to internal pressure as is commonly done in the prior art vacuum coffee percolators.

It should be noted that the hot water jacket precludes too abrupt cooling of the main chamber and thus prevents too rapid a siphon action, so that the time interval of percolation is fully sufficient, without any preliminary period of maceration, as is unavoidable with prior art vacuum coffee percolators wherein practically all of the water must first be mixed with the ground coffee before the percolation actually begins and is more in the nature of filtering than actual percolation.

In the present invention, the ground coffee container C need be no larger than necessary to hold the required quantity of coffee, and it will be noted that the hot water does not contact the ground coffee until percolation actually begins, and that the air is excluded during the percolation period, so as to preclude loss of aroma to the atmosphere. Furthermore, when the float F is used, it further protects against loss of aroma otherwise due to vaporization of volatile constituents from the surface of the completed coffee beverage.

When the percolation is completed, the vents 8 and 11 are opened in the previously described manner, and the beverage is withdrawn through the spigot 18.

Figure 2:
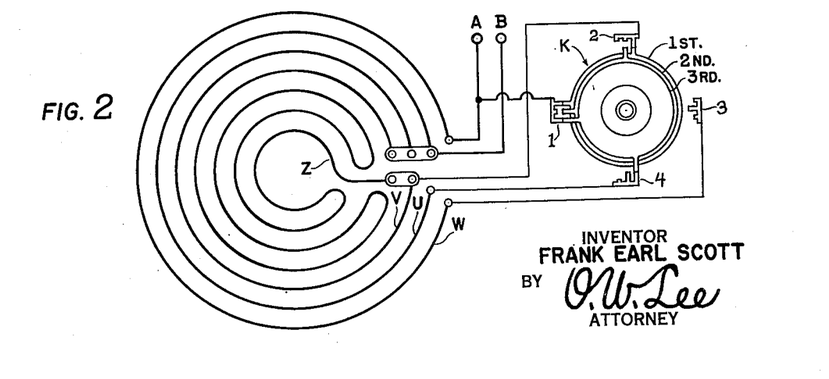
Fig. 2 shows a diagram of the electric circuits for selectively operating the heating elements of Fig. 1.

Fig. 1 shows a suitable hot plate for selectively heating the main chamber M and the water jacket J, and Fig. 2 shows a wiring diagram of the circuits when operated by a three deck switch. The heating elements Z, V, U and W are concentrically arranged in a refractory plate 19 supported upon a suitable base 20. The element Z consists of a number of turns covering an area corresponding to the area of the main chamber M, and the coils V, U, and W occupy an area corresponding to the water jacket J.

As shown in Fig. 2, the four heating elements Z, V, U and W are selectively operated by the switch K which is of the three-deck type having four terminals. The 1st and 2d decks, each have two contacts in corresponding quadrants, and the 3d deck has two contacts in the adjacent quadrant counterclockwise thereto. The terminal 1 has two contacts in the 1st and 3d decks only. The terminal 2 has one contact in the first deck only. The terminal 3 has one contact in the 2d deck only. The terminal 4 has two contacts in the 2d and 3d decks only.

Current is supplied from the source, through the outlets A—B. The outlet A is connected to the terminal 1. The central heating element Z is linked to the heating element V and connected to the terminal 2. The heating element U is connected to the terminal 4, and the opposite ends of these three elements U, V and Z are linked together and directly connected to the outlet B. The terminal 3 is connected to the heating element W and the opposite end thereof is connected direct to the outlet A.

From this description, it will be seen that in the position of the switch K in Fig. 2, the 1st deck closes the circuit between the terminals 1 and 2 so as to connect the heating elements V and Z in parallel; and the 3d deck closes the circuit between the terminals 1 and 4 so as to connect the heating element U in parallel. In this manner the central heating element Z supplies the heat for boiling the water in the main chamber M, and the two coils V and U supply a greater amount of heat for boiling the water in the water jacket J.

It will be seen that a quarter turn of the switch K will leave all circuits open, so as to supply no heat during the period of vacuum percolation. It will also be seen that a half turn of the switch K will cause the 2d deck to close the circuit between the terminals 3 and 4 so as to connect the heating elements U and W in series and thus supply low heat to keep the water in the water jacket hot, and consequently keep the coffee in the main chamber M hot without applying direct heat thereto. It will also be seen that the next quarter turn of the switch K will leave all circuits open, so as to turn off the heat when no longer required. Thus it will be seen that the four positions of the switch can be appropriately labeled "Boil—Off—Hot—Off" so as to provide a convenient index for the user. Other modes of heat control may be employed to accomplish similar results; or if desired, the percolator can be placed on any suitable gas or electric hot plate without resorting to selective heating.

The foregoing description provides a good understanding of the general nature and principle of the invention, which is susceptible of various modifications based upon substantially the same principle. The parts which have been indicated by capital letters are generic in their nature, and will be indicated by the same letters in the other embodiments disclosed.

Figure 3:
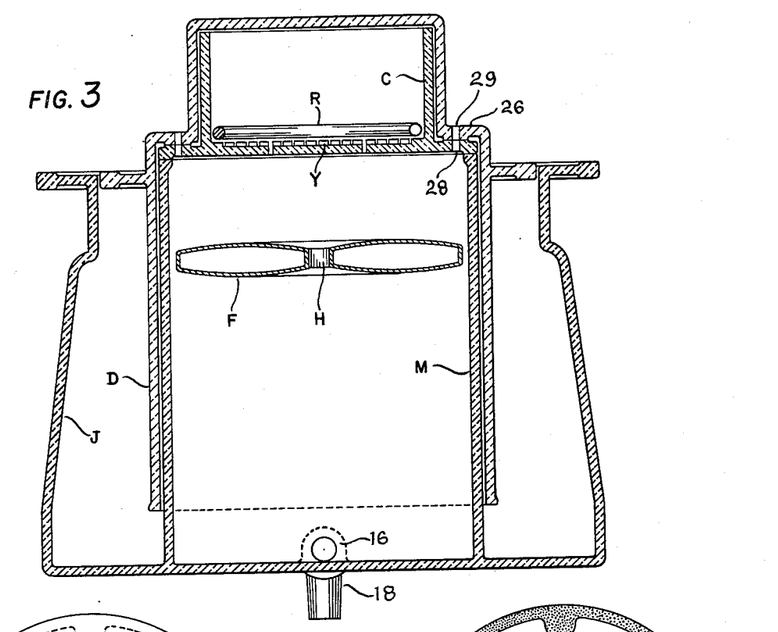
Fig. 3 shows a vertical section of the invention with modified vents.

Fig. 3 shows the device of Fig. 1 with modified vents, so that the main chamber vents direct to atmosphere through the registering vents 28 and 29. In this instance, the previously described lips 5 are omitted, and the top rim of the main chamber M and the underside of the coffee container C are ground to form a contacting seat. As shown in Fig. 6 the upper side of the flange of the coffee container is provided with a number of arcuate areas 27 which are ground flat, and a vent 28 is provided in one or more of these areas. The shoulder 26 of the bell jar D is provided on its underside with ground areas corresponding with those shown in Fig. 6, and one or more of these areas are provided with a vent 29, so that the vents 28 and 29 can be registered for venting the main chamber M. Here the bell jar D is rotated with respect to the ground coffee container C and the rotation of the latter with relation to the main chamber M is irrelevant. As shown in Fig. 6 the length of each ground area 27 is greater than the distance between them, and it will be realized that since the ground areas of the bell jar are the same as these, the ground areas of one part will always overlap those of another, which is desirable for free rotation and to avoid chipping. The mode of operation is the same as described for Fig. 1.

Figures 10, 11:
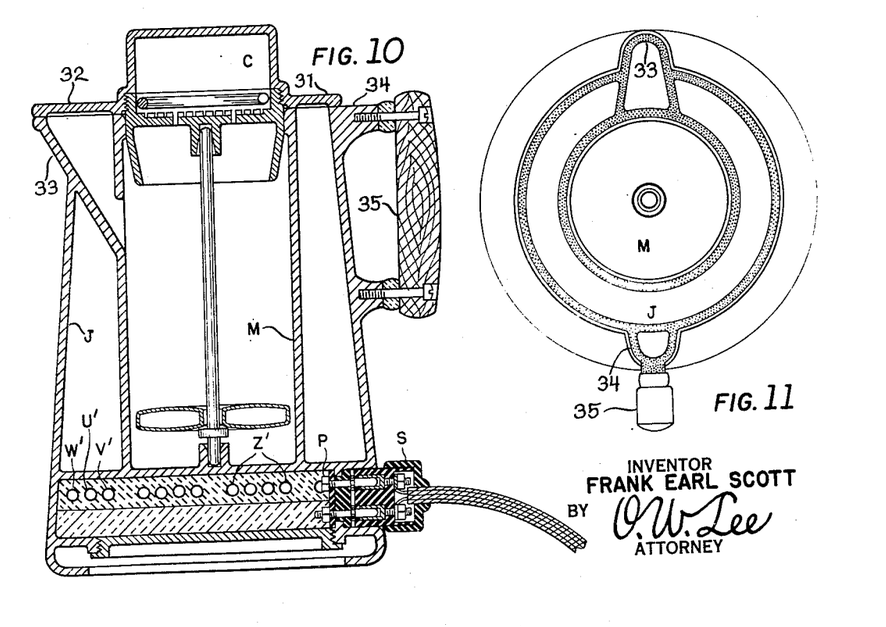
Fig. 10 is a vertical section showing the far half of Fig. 8.
Fig. 11 is a plan view of the lower portion of the embodiment shown in Figs. 8, 9 and 10, as it appears after the top portion is manually removed.

Figs. 8, 9, 10 and 11 show the invention when made in the form of a coffee pot, which is highly desirable because it affords the convenience of pouring from a spout. As here shown the coffee pot comprises a main chamber M surrounded by a water jacket J; and a spout 33 extends from the main chamber M out through the water jacket J and is integral with the walls of the water jacket and main chamber. The top edges of these parts are ground flat as indicated in Fig. 11, including the upper bracket 34 which is made to correspond with the projecting portion of the spout 33. The bell jar is supplanted by a siphon tube 30, and the ground coffee container C is made integral with a cover 31 which has a lip 32 corresponding to the spout 33 of the coffee pot and also with the top bracket 34 to which the handle 35 is attached. The underside of the cover 31 is provided with ground areas corresponding with those of Fig. 11 so that the cover 31 can effectually seal the main chamber M and the spout 33, a port 36 being provided in the cover so that the water jacket J is vented at all times.

Figures 8, 9:
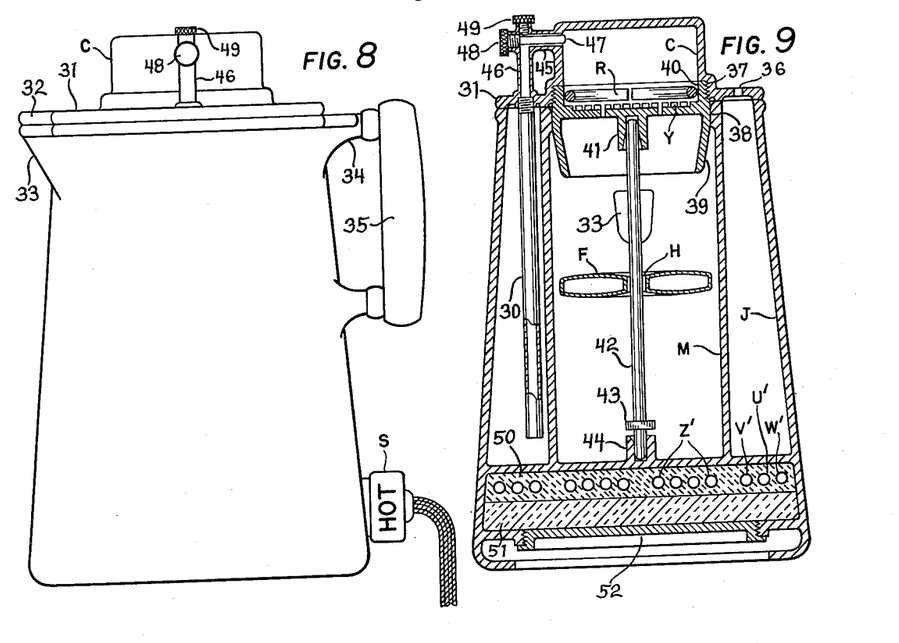
Fig. 8 is a side elevation of the invention when made as a coffee pot.
Fig. 9 is a vertical section showing the left half of Fig. 8.

The ground coffee container C is integral with the cover 31 and is internally threaded as indicated at 37 so as to receive the threaded collar 40 of the filter support Y which has a depending skirt portion 38 closely fitting within the main chamber M; the lower portion 39 of the skirt being tapered to facilitate assembling. The ring R is retained on the filter support Y by frictional engagement inside the collar 40.

A socket member 41 is centrally located on the underside of the filter support Y, and a like socket member 44 is centrally located in the bottom of the main chamber M. The rod 42 engages in these two socket members and the float M is slidably engaged thereon, the flange 43 limiting the downward movement of the float.

The ground coffee container C is connected to the water jacket J by a siphon which comprises a horizontal portion 45 and a vertical portion 46 which joins the cover and is internally threaded to receive the siphon tube 30 which extends downwardly to within an appropriate distance from the bottom of the water jacket J so as to leave a suitable amount of water after the siphon action is completed.

The horizontal portion 45 of the siphon may be suitably screened to exclude coffee grounds; but preferably, this result is better accomplished by the stud 47 which is removably secured in this portion of the siphon and has suitable clearance therewith, so as to afford a water passage and also exclude coffee grounds from the siphon. The illustrated threaded engagement and the knurled head 48 enable the stud 47 to be conveniently removed for routine cleansing, and the knurled stud 49 can be conveniently removed so as to facilitate cleansing the vertical portion of the siphon.

In the operation of this embodiment of the invention, the cover 31 is removed and the proper amounts of water placed in the main chamber M and water jacket J as previously explained. The float F is assembled upon the rod 42 and the lower end of the rod is engaged in the socket 44. The filter support Y is removed from the ground coffee container C and a filter is placed in position upon the support Y and secured in place by the ring R which fits friction tight. The ground coffee container is inverted and the proper amount of ground coffee placed therein, after which the filter support Y is threaded into position and these parts are then assembled upon the coffee pot with the lip portion 32 turned to register with the bracket 34 instead of with the spout 33. In this position it will be seen that the main chamber M is vented through the open spout 33 and the water jacket J is vented through the port 36.

The water is boiled as previously described, and when the steam has sufficiently displaced the air in the main chamber M, the heating is discontinued and the cover 31 is rotated so as to register the lip 32 with the spout 33 and hermetically seal the main chamber M, the lower end of the siphon tube 30 having an air seal by virtue of the water in the water jacket. As soon as the steam in the main chamber M begins to condense, the hot water in the water jacket will be siphoned through the ground coffee and into the main chamber M in the manner previously described relative to Fig. 1.

When the percolation is completed, the cover 31 is rotated to position the lip 32 over the bracket 34 so as to leave the spout 33 open for pouring the coffee.

The skirt 38 fitting within the main chamber M holds the cover 31 in position when the coffee pot is tilted for pouring. The float F being guided by the rod 42 effectually precludes abrupt movements of the float during pouring of the coffee, as would otherwise occur if the float was left unrestrained.

It should also be noted that if the main chamber M is inadvertently left closed during the heating period, that it would be impossible to blow the cover off, because as soon as the pressure lifted the cover slightly, there would be an open vent by way of the spout 33, thus affording safety in any such inadvertence.

As here shown the coffee pot is provided with internal heating elements arranged the same as previously described, but the circuits are controlled by a four terminal plug P and socket S, the wiring diagram being shown in Fig. 7. As there shown, the heating elements Z', V' and U' are linked together in parallel and connected to the two upper terminals of the plug P; and the heating element W' is connected to the two lower terminals. These terminals are equidistant apart, and the socket S has tubular terminals mating therewith. The source of power from the outlet A—B is connected to the two upper terminals of the socket S so that when they are engaged with the two upper terminals of the plug P the three heating elements Z', V' and U' will supply heat for the boiling period; and when the socket S is reversed half a turn, the heating element W' will supply heat for keeping the water in the water jacket hot. Here, the heating element W' is of suitable length and resistance to serve the purpose previously described when the elements U and W are in series as disclosed under Fig. 2. It will be seen that when the socket S is turned a quarter rotation in either direction and the terminals engaged, then both of the circuits will be open, and it should be noted that this is of advantage in restraining the outlet cord during the percolation period, because otherwise it would probably fall to the floor if detached and laid alongside of the percolator on the dining table. The four sides of the socket S can be appropriately labeled to guide the user in selecting the desired position.

As here shown these heating elements are mounted in a refractory material 50, below which there is a layer of heat insulating material 51, these two materials being either packed or else cast therein and sealed by the threaded closure 52. This of course being done after the plug P is installed in the base of the coffee pot in a driven fit union so as to assure a perfectly water tight seal of the heating elements.

If desired, these heating elements can be omitted and the capacity of the coffee pot increased by extending the main chamber M and water jacket J to the bottom of the coffee pot, so as to heat them on any gas or electric hot plate, or upon any stove or camp fire, in which case the invention will function in the previously described manner, care being exercised to prime the main chamber with sufficient water to preclude boiling dry before the water in the water jacket comes to a boil.

Figure 12:
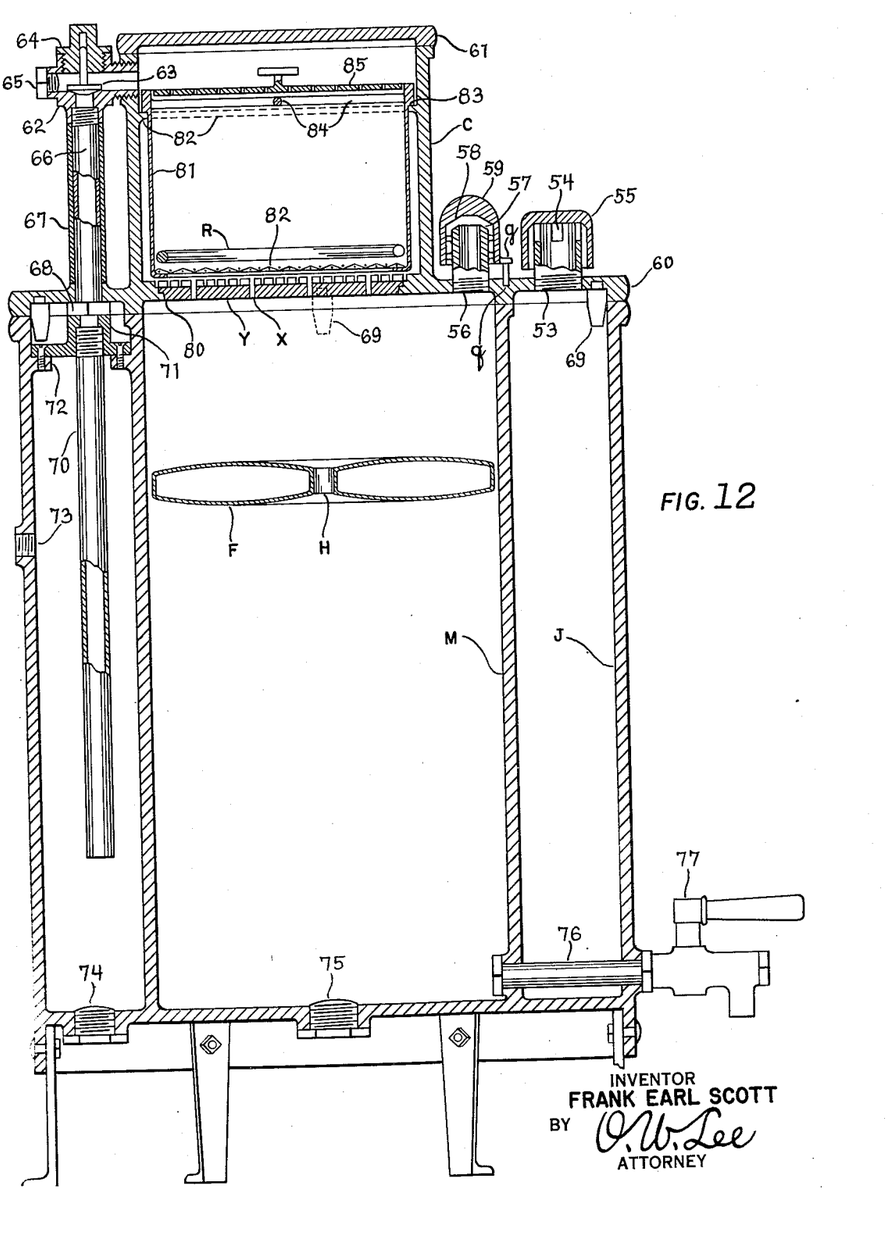
Fig. 12 is a central vertical section of an embodiment suitable for large scale making of coffee.

When the invention is used for making beverage coffee in commercial quantities such as for delivery in large thermally insulated dispensing containers, for serving coffee at picnics, conventions and other large gatherings; or, for producing coffee for commercial bottling and distribution in the manner used for various soft drinks, the embodiment of Fig. 12 is employed.

Here the main chamber M is surrounded by the water jacket J as in the previously described embodiments, and the cover 60 seats upon the top rims of the main chamber and water jacket; the contacting surfaces being ground to seat airtight. The ground coffee chamber C is integral with the cover 60 and is provided with its own cover 61, the contacting surfaces being ground to seat airtight.

A coupling 62 is threaded into the ground coffee chamber C. This coupling 62 contains the gravity valve 63 which has its stem slidably mounted in a bore of the cleanout plug 64 which is vertically threaded into this coupling. The vertical pipe 66 which has a hollow head 68 passes through the cover 60 and is threaded into the coupling 62; the sleeve 67 being used as a spacer element so that the head 68 can be drawn up to seat tightly. The siphon pipe 70 is threaded into a bored fitting 71 which is bolted to brackets 72 on the walls of the water jacket. The hollow head 68 seats on the fitting 71 so as to register the pipe 66 with the pipe 70. After all of these parts are assembled together, it is a simple matter to grind to a common plane, all of the surfaces which are to seat airtight. After the contacting surfaces have been ground to seat, a number of non-metallic legs 69 are secured on the underside of the cover 60 to serve as pilot posts for placing the cover in proper position, and also to support the ground surfaces of the cover free from any support upon which it may be placed when removed, so as to thereby protect the ground surfaces from abrasion.

The water jacket J is preferably provided with an overflow port 73 and a drain plug 74, and is constantly vented through the pipe 53 which is slotted as indicated at 54 and provided with a loose fitting cover 55. The pipe 53 is of sufficient diameter to be utilized for filling the water jacket J if desired.

The main chamber M is preferably provided with a drain plug 75 and an outlet 76 which is connected to the spigot 77. Venting is provided by means of the pipe 56 which has a valve seat 57 on its upper end, which mates with the valve seat 58 on the inside of the loose fitting cover 59. This vent may be held open in any suitable manner, as for instance, the cover 59 may be provided with a projecting tongue $q$ supported upon a post $q$ when in the raised position, and turned aside from the post when in the closed position. Other modes will readily suggest themselves.

Here the filter support Y is shown as a removable plate fitted into position as indicated by the joint 80. This being desirable when continuous operation is desired, as it enables the main chamber M to be flushed out between each percolation, without removing the cover 60. For this purpose, it is also desirable to provide the ground coffee container C with a basket 81 having a screen bottom 82, in which case a filter sheet can be used in the bottom of this basket and weighted by the ring R, and a second filter sheet can be positioned upon the support Y and held in place by the bottom of the basket; or in instances where a filter in the bottom of the basket is fully sufficient, the filter support Y may be omitted and this area left open.

As here shown, the basket has an external shoulder 83 which seats on an internal flange 82 projecting from the wall of the coffee container C. Radiating rods 84 brace the basket 81 and also provide support for the multiperforate plate 85 which serves the two-fold purpose of confining the ground coffee within the basket 81 and also serves to distribute the incoming hot water evenly over the entire area of the basket, which is of advantage where the equipment is of large capacity. It will also be seen that the rods 84 provide a convenient grasp for removing the basket 81 after each percolation is completed.

Heating may be provided in any suitable manner, and the operation is essentially the same as previously described. The water jacket J may be filled in any suitable manner either through the vent pipe 53 or by a hot water pipe connected direct to the water jacket, the outlet 73 serving as an overflow level, and of course the overflow may be piped to any convenient drain. Furthermore, after the boiling period is completed, this outlet 73 may be utilized for passing a current of air through the water jacket and out the vent 53 so as to sweep the steam out of the water jacket and thus shorten the interval between the boiling period and the percolation period, as is sometimes desirable in large scale production where the quantity of heat transfer required to effect the required temperature reduction, would otherwise consume time that might very well be utilized in increased production by the use of a current of air as here explained. It will of course be understood that there may be two such ports as 73, one for air and one for overflow.

Where the coffee is made for immediate bottling, the spigot 77 may be supplanted by a tube leading to the bottling machine, and it will be seen that the basket 81 can be removed during the bottling period, and refilled with ground coffee ready for the next percolation, so that as soon as the coffee is bottled, the filter support Y can be removed and the main chamber M flushed out with a spray of hot water, and drained ready to start the next batch immediately, and without any necessity for removing the cover 60, all of which conserves time and increases production.

The cover 60 may be provided with any suitable handles for lifting it in and out of position; and these handles may be lateral projections so that the previously described legs 69 can be placed externally in the handles instead of internally as here shown.

The purpose of the valve 63 is to prevent any return flow when the water seal is broken at the end of each percolation period. This prevents coffee from entering the water jacket, which would be objectionable in large equipment. This valve is intended only as an example, and it will be understood that various other forms of valve may be employed, as for instance, a ball valve; or in some instances the valve may be omitted.

In some instances, the basket 81 is not employed, and instead, the ground coffee is placed in a closed cloth sack which will fit against the walls of the ground coffee container C. When this practice is intended, the flange 82 can also be omitted.

In the various embodiments, the filter support Y is intended only as an example, and it will be understood that various other means may be employed for supporting a filter, as for instance a multiperforated plate will suffice.

It should be mentioned, that in the embodiment shown in Fig. 12, it is not essential that the cover 60 seat airtight on the top rim of the water jacket J. The device will function just the same, if the water jacket is left wide open; and the prime reason for seating the cover on the water jacket, is because grinding this surface is a mechanical assistance for grinding the surface which contacts the top rim of the main chamber M. Likewise, in Fig. 5, a single area 7 with its vent 8 is sufficient, but inasmuch as glass is usually ground on a lap, it is advisable to have equilateral areas to be ground, as that is of mechanical advantage in keeping the workpiece from rocking on the grinding lap. In like manner, in Fig. 1, a single lip 5 would suffice, but four such lips are of advantage for mechanical convenience in grinding.

In large commercial embodiments, particularly for bottling works, the hot water chamber is sometimes made as a separate unit, instead of as a water jacket, and this will suffice where the coffee is quickly bottled. In such instances, the operation is of course, essentially the same as described under Fig. 12, it being understood that in such instances the siphon tube is suitably disposed so as to lift the water from the hot water chamber.

In Fig. 12 the valve cap 59 should be sufficiently light weight and the tube 56 of sufficient diameter so that this valve will open with but slight steam pressure, should the operator neglect to manually open the valve. Any other suitable type of valve may be employed, as for instance a loose ball type of valve will suffice; it of course being understood that the valve must be manually unseated while withdrawing the finished coffee beverage from the main chamber. It will also be seen that the spout of Fig. 10 can be internally provided with a valve seat so as to accommodate a ball valve, instead of being closed by the lip as there shown. Other modes of temporarily sealing the spout, will readily suggest themselves.

It will be noted that the invention eliminates the need for gaskets which are essentially necessary in vacuum type percolators which lift the water by internal pressure. Such gaskets are usually of rubber, and of course they deteriorate from heat and use, so as to require repeated replacing by a new one. Also, a slight taste of rubber is sometimes imparted to the coffee. The ground joints of the present invention provide an effective airtight-seal and no gaskets are necessary. When properly ground they are airtight when dry and do not require any wetting. In any instance where minor mutilation of the ground surface causes a slight leak, it can be conveniently rendered airtight by lightly coating the contacting surface with syrup spread on with the finger, which is far more preferable than a gasket. However, in some instances, the invention may be made with gaskets if desired.

In the present disclosure, I claim as my invention:

1. A vacuum siphon percolator comprising a main chamber, a constantly vented hot water jacket surrounding the side walls only of said main chamber, a ground coffee container seating upon said main chamber and having an airtight union with the walls thereof and a communication with the interior thereof, a siphon leading from said ground coffee container and into said hot water jacket, means for venting said main chamber direct to atmosphere while boiling water therein, means for hermetically sealing said main chamber so that condensation of steam therein will afford a partial vacuum and thereby lift water from said hot water jacket through said siphon and through said ground coffee container and into said main chamber whereby said hot water jacket will retard the temperature drop within said main chamber thereby retarding the rate of flow through said ground coffee container.

2. A vacuum siphon percolator comprising a main chamber, a ground coffee container communicating with said main chamber and having an airtight union therewith, a constantly vented hot water jacket surrounding the side walls only of said main chamber, a siphon leading from said ground coffee jacket and into said hot water container, means for venting said main chamber direct to atmosphere while boiling water therein, means for hermetically sealing said main chamber so that condensation of steam therein will afford a partial vacuum and thereby produce a unidirectional flow from said hot water jacket through said siphon and said ground coffee container and into said main chamber whereby said hot water jacket will retard the temperature drop within said main chamber thereby retarding the rate of flow through said ground coffee container.

3. A vacuum siphon percolator comprising a main chamber, a constantly vented hot water jacket surrounding the side walls only of said main chamber, a spout extending from said main chamber and through said water jacket, a cover including a lip hermetically sealing said main chamber and said spout, a ground coffee container carried by said cover and opening into said main chamber, a perforate filter support detachably secured to the bottom of said ground coffee container, a siphon tube leading from said ground coffee container and into said hot water jacket, said cover being rotatably mounted on said main chamber so as to move said lip in and out of register with said spout so as to vent said main chamber through said spout when said lip is out of register and to hermetically seal said main chamber when said lip registers on said spout.

4. A vacuum siphon percolator comprising a main chamber, a constantly vented hot water jacket surrounding the side walls only of said main chamber, a spout extending from said main chamber and through said water jacket, a cover including a lip hermetically sealing said main chamber and said spout, a ground coffee container carried by said cover and opening into said main chamber, a perforate filter support having an upstanding peripheral rim, a filter retaining ring frictionally engaged inside said rim, means for detachably securing said filter support in the bottom of said ground coffee container, a siphon tube leading from said ground coffee container and into said hot water jacket, said cover being rotatably mounted on said main chamber so as to move said lip in and out of register with said spout so as to vent said main chamber through said spout when said lip is out of register and to hermetically seal said main chamber when said lip registers on said spout.

5. A vacuum siphon percolator comprising a main chamber, a constantly vented hot water jacket surrounding the side walls only of said main chamber, a ground coffee container communicating with said main chamber and having an airtight union therewith, a siphon tube leading from said ground coffee container and into said hot water jacket, a stud secured axially within the upper end of said siphon tube and having slight clearance therein so as to exclude ground coffee from said siphon tube and water jacket, means for venting said main chamber direct to atmosphere while boiling water therein, and means for hermetically sealing said main chamber temporarily.

6. A vacuum siphon percolator comprising a main chamber, a constantly vented hot water jacket surrounding the side walls only of said main chamber, a ground coffee container communicating with said main chamber and having an airtight union therewith, a siphon tube leading from said ground coffee container and into said hot water jacket, means for venting said main chamber direct to atmosphere while boiling water therein, and means for hermetically sealing said main chamber temporarily so that condensation of steam therein will afford a partial vacuum and induce a flow of water from said hot water jacket through said siphon tube and through said ground coffee container and into said main chamber whereby said hot water jacket will retard the temperature drop within said main chamber thereby retarding the rate of flow through said ground coffee container.

7. A vacuum siphon percolator comprising a main chamber, a constantly vented hot water jacket surrounding the side walls only of said main chamber, a cover hermetically sealing said main chamber, a ground coffee container carried by said cover and opening into said main chamber, said ground coffee container being externally of said cover and excluded from the heated zone of said hot water jacket, a perforate filter support forming a removable bottom in said ground coffee container, a siphon tube leading from said ground coffee container and into said hot water jacket, means for venting said main chamber direct to atmosphere while boiling water therein, and means for hermetically sealing said main chamber temporarily, so that condensation of steam therein will afford a partial vacuum and induce a flow of water from said hot water jacket through said siphon and through said ground coffee container and into said main chamber whereby said hot water jacket will retard the temperature drop within said main chamber thereby retarding the rate of flow through said ground coffee container.

8. A vacuum siphon percolator comprising a main chamber, a constantly vented hot water jacket surrounding the side walls only of said main chamber, a cover for said main chamber, a ground coffee container carried by said cover and opening into said main chamber, said ground coffee container being externally of said cover and excluded from the heated zone of said hot water jacket, a siphon leading from said ground coffee container and into said hot water jacket, means for venting said main chamber direct to atmosphere while boiling water therein, and means for hermetically sealing said main chamber temporarily so that condensation of steam therein will afford a partial vacuum and induce a flow of water from said hot water jacket through said siphon and through said ground coffee container and into said main chamber whereby said hot water jacket will retard the temperature drop within said main chamber thereby retarding the rate of flow through said ground coffee container.

9. In a vacuum siphon percolator, a main chamber, a hot water chamber, a ground coffee container communicating with said main chamber and having an airtight union therewith, a siphon tube leading from said ground coffee container and into said hot water chamber, a stud secured axially within the upper end of said siphon tube and having slight clearance therein so as to exclude ground coffee therefrom.

FRANK EARL SCOTT.